UNITED STATES PATENT OFFICE.

AUGUST LEOPOLD LASKA AND GEORG LIST, OF OFFENBACH-ON-THE-MAIN, GERMANY, ASSIGNORS TO CHEMISCHE FABRIK GRIESHEIM ELECKTRON, OF FRANKFORT-ON-THE-MAIN, GERMANY, A CORPORATION.

BLUE SULFUR DYE AND PROCESS OF MAKING SAME.

No. 841,877.     Specification of Letters Patent.     Patented Jan. 22, 1907.

Application filed March 21, 1906. Serial No. 307,272. (Specimens.)

*To all whom it may concern:*

Be it known that we, AUGUST LEOPOLD LASKA, doctor of philosophy, chemist, and GEORG LIST, doctor of science, chemist, residents of 5 Gerberstrasse resp. 37 Obermainstrasse, Offenbach-on-the-Main, in Grand Duchy of Hesse, German Empire, have invented new and useful Improvements in Blue Sulfur Dyes and Processes of Making Same, of which the following is a specification.

We have found that by heating monoalkylpara 1-amido-meta 1 chlor-para-oxydiphenylamins with alkaline polysulfids under certain conditions blue dyestuffs of great technical value and very bright shade are obtained. These dyestuffs are very fast to washing and contain no chlorin. The diphenylamin derivatives may be obtained by the joint oxidation of para amidophenol and orthochlormonoalkylanilin in equimolecular proportions and reduction of this oxidation product.

The following examples will serve to illustrate the nature of our invention and the manner in which the same may be carried into practical effect.

The parts are by weight.

*Example I—Preparation of the diphenylamin derivatives.*—Mix a solution of three hundred and twenty-seven parts of para amidophenol in fifteen hundred parts of water and four hundred parts of hydrochloric acid, (20° Baumé,) with a solution of four hundred and twenty-five parts of orthochlormonomethylanilin, (described by Friedlaender in the *Monatshefte für Chemie* 1898, page 638,) in three thousand five hundred parts of water and seven hundred parts of sulfuric acid, (66° Baumé.) Cool the whole by adding ice and allow, stirring meanwhile, a solution of six hundred parts of sodium bichromate in two thousand parts of water to flow in quickly. Keep the temperature below zero centigrade during the reaction. The indophenol is formed quickly and partially separates out in a crystalline form. It is easily soluble in alcohol with a dark blue color. When oxidation is ended, add a solution of two thousand six hundred and fifty parts of caustic-soda lye (35° Baumé) and afterward a solution of eleven hundred parts of crystallized sodium sulfid in two thousand parts of water and heat the whole by means of direct steam to 70° centigrade. The para oxy para 1-methylamido meta 1 chlor-diphenylamin goes into solution, whereas chromium hydrate remains undissolved and may be removed by filtering. To the hot filtered solution add three thousand four hundred and fifty parts of hydrochloric acid (20° Baumé) and filter off from insoluble impurities. The separation of the hydrochloric base from the cooled filtrate may be completed by the addition of common salt. The thus obtained hydrochloric base forms needles of a greenish color. The free base shows a melting-point of 105° centigrade. Alkaline solutions of it are rapidly oxidized by the oxygen of the air. The para oxy para 1-amidoethyl meta 1 chlor diphenylamin may be obtained in the same manner. It shows a melting-point of 115° centigrade. In order to transform the para oxy para 1-ethylamido meta 1 chlor diphenylamin into a blue sulfur dyestuff, we proceed, for instance, as follows:

*Example II—Preparation of the dyestuff.*—Two hundred and forty parts of crystallized sodium sulfid, ninety-six parts of sulfur, and fifty parts of water are melted together, and as soon as the sulfur be dissolved seventy-four and a half parts of para oxy para 1-ethylamido meta 1 chlor diphenylamin and thirty-five parts of caustic-soda lye (35° Baumé) are introduced at a temperature of about 50° centigrade. The solution is evaporated till the temperature has risen to about 115° centigrade. This temperature is maintained during fourteen hours. The melt is dissolved in two thousand five hundred parts of water, the solution filtered, and the coloring-matter precipitated by introducing a current of air. The thus obtained dyestuff is a black-violet powder, almost insoluble in water, alcohol, glacial acetic acid, and benzene. It dissolves in hot glycerin and concentrated sulfuric acid with a dark-blue color and in water in presence of sodium sulfid with a violet tint. It dyes direct reddish-blue shades on unmordanted cotton, which are very fast to washing, to light, and acids.

The dyestuff of the methylized base may be obtained in the same manner. It dyes direct blue shades on cotton. The general properties of the dyestuff, however, remain the same.

In melting together the base with sulfur and sodium sulfid the proportion of sulfur to sodium sulfid must be such a one that alkaline trisulfid or pentasulfid can be formed.

Now what we claim, and desire to secure by Letters Patent, is the following:

1. The process of producing blue sulfur dyestuffs by heating monoalkyl para 1-amido-meta 1 chlor-para-oxydiphenylamins with polysulfids substantially as described.

2. The blue sulfur dyes obtained from monoalkyl para 1-amido-meta 1 chlor-para-oxydiphenylamins by heating with alkaline polysulfids which in a dry state are dark-violet powders almost insoluble in pure water, alcohol, benzene and glacial acetic acid; easy soluble in hot glycerin and concentrated sulfuric acid with a dark-blue color and in water containing alkaline sulfids with a violet tint; dyeing cotton from such a solution blue shades being very fast to washing light and acids.

In testimony that we claim the foregoing as our invention we have signed our names, in presence of two witnesses, this 8th day of March, 1906.

AUGUST LEOPOLD LASKA.
GEORG LIST.

Witnesses:
EVA SATTLER,
OSKAR STANDHARDT.